UNITED STATES PATENT OFFICE.

OSCAR L. BARNEBEY, OF CLEVELAND, OHIO.

PROCESS FOR THE MANUFACTURE OF CYANIDS.

1,355,642.  Specification of Letters Patent.  Patented Oct. 12, 1920.

No Drawing.  Application filed March 19, 1919.  Serial No. 283,637.

*To all whom it may concern:*

Be it known that I, OSCAR L. BARNEBEY, a citizen of the United States, and residing at Cleveland, Ohio, have invented certain new and useful Improvements in Processes for the Manufacture of Cyanids, of which the following is a specification.

This invention relates to the manufacture of cyanids and more especially sodium cyanids. The process in generic principle can be applied to the manufacture of other cyanids. The fundamental discovery involved in this process for the manufacture of cyanids is the use of activated carbon or activated material containing carbon for the production of cyanids.

"Activated carbon" is carbon which has been heat treated with a reactive gas in such a manner as to make it more reactive than ordinary carbon or carbon-containing material, such as coal, coke or charcoal. One of the best ways of making activated charcoal is to heat it in the presence of steam or carbon dioxid at temperatures above 700° C. for the appropriate time. Carbon material prepared in this manner is found to be much more active in the manufacture of cyanids than carbon which has not been thus treated. The activated carbon or carbon-containing material absorbs nitrogen to a much greater extent than ordinary carbon or materials containing carbon. Likewise activated carbon has much more surface available for reaction than carbon which has not been activated.

The finely pulverized activated charcoal and finely pulverized base or another compound of the metal of the cyanid desired, which compound will in the subsequent treatment yield a base, are thoroughly mixed, or a compound of the metal is dissolved in some solvent, such as water and the activated charcoal added to the solution by which process the activated charcoal absorbs the solution, thus giving on drying a very intimate mixture. If desirable, any appropriate catalyzer may be added to speed the rate of reaction, in which case the finely divided catalyzer or solution of the same is thoroughly incorporated by mixing with the reaction mass. The mixture is then heated in an atmosphere of nitrogen for the required length of time at the appropriate temperature for thorough reaction, thus producing the cyanid desired.

In the manufacture of cyanids especially sodium cyanid this invention finds specific application.

The fundamental reaction is based upon heating sodium carbonate with activated carbon or activated material containing carbon in the presence of nitrogen. The reaction of sodium carbonate and carbon with nitrogen to form sodium cyanid has been known for a long time, however, this invention makes use of a more reactive form of carbon which absorbs the nitrogen to a much greater extent and likewise furnishes a much greater surface of carbon for reaction thus giving a much more rapid and efficient method for the production of cyanids and more particularly sodium cyanid than can be obtained with the usual or ordinary carbon materials.

The reaction is best conducted in the presence of a catalyzer, such as metallic iron. The quantity of the iron used may vary widely. In general, it may be stated that the larger the amount of iron present the more rapid is the reaction to form cyanids. The iron also facilitates the conduction of heat through the material being treated. However, large amounts of iron are not necessary for the reaction to take place. Very small amounts of iron even less than 1% of the total weight of product treated will suffice to produce cyanids. In fact iron to the extent of 5% of the total material present gives a very good reaction indeed. The iron may be added as metallic iron, oxid of iron or compound of iron which is reducible by the activated carbon to form metallic iron. Oxid ores serve very well as a source for iron.

The entire mass of material should be thoroughly mixed before it is heated. By first dissolving the sodium carbonate in water and then adding activated carbon to it, the latter takes up the former and upon subsequent drying a very excellent admixture of sodium carbonate and activated carbon is obtained. The finer the subdivision of the reactive material thus giving a maximum surface for contact the more rapid the reaction. The existence of larger particles also throughout the mass in order to give porosity to the entire charge has certain advantages.

The finely divided iron, oxid of iron or compound containing iron can be mixed with the activated carbon either before or after it has been mixed with sodium carbonate or sodium carbonate solution taken up by the activated carbon.

When mixing is complete the mass is thoroughly dried, after which the material is charged into a furnace and heated at temperatures from substantially 800° C. to 1150° C. for sufficient length of time for thorough reaction. In general it may be stated that the time required decreases with increase in the temperature at which the material is being heated, temperatures as low as about 700° C. greatly prolonging the time necessary.

After the charge has been heat processed, the sodium cyanid is extracted with water or some other solvent and the residue consisting of iron and activated carbon used again in the process. The sodium cyanid may be crystallized from solution or the solution evaporated thus yielding hydrated or anhydrous sodium cyanid according to the temperature following conventional methods now in use. The charge directly from the furnace may be treated with steam thus converting the cyanid to volatile ammonia and solid sodium formate both valuable products in the industries. The solid sodium formate may be extracted from iron and activated carbon by water or some other solvent. If there is no desire to utilize the sodium formate the entire mass may be utilized as a component part to make up subsequent charges in cyanid production. Upon heating sodium formate is converted back to sodium carbonate.

The following examples are representative of the direct application of this invention:

I. *Manufacture of sodium cyanid.*

The activated charcoal is ground to a fine consistency and about ten per cent. of its weight of finely ground iron ore is added. While the activated charcoal and iron ore are being thoroughly mixed, sodium carbonate equal in weight to the activated charcoal used is dissolved in water and added to the mixture. Mixing is continued until the entire mass is thoroughly uniform. Just sufficient water is added to dissolve the sodium carbonate as will be taken up completely by the activated carbon.

After mixing and drying, the mass is heated in a furnace with an excess of nitrogen to approximately 900° C. long enough to give thorough reaction. When reaction is complete the charge is withdrawn from the furnace, extracted, the solution evaporated and then dried to obtain sodium cyanid; or the charge is treated with steam to produce ammonia and sodium formate. The residual activated carbon and iron, and sodium formate as well if not desired for some other useful purpose, are worked back in the next charge thus conserving materials.

II. *Manufacture of barium cyanid.*

Activated charcoal and barium oxid or carbonate are ground to a fine consistency in the ratio of four to six by weight and finely ground iron to the extent of five per cent. by weight added. The mass is thoroughly mixed and while mixing is in progress sufficient water is added to just moisten the charge. The charge is then thoroughly dried and the material heated in an atmosphere of nitrogen in a furnace in a manner analogous to Example I except that the temperature may vary between 1000° and 1500° C., depending upon the time of heating the charge. Here also the time required decreases with increase in the temperature at which the material is being heated.

The above examples serve to illustrate the application of this invention. However, the invention is not limited to these specific examples nor is it limited to the exact manner in which the applications are made. The use of activated charcoal in the manufacture of cyanids lends itself to many modifications and variations.

When the nitrogen supply comes from the air, by fractionation of liquid air or otherwise, and is caused to react with activated carbon, a base or base yielding compound and a catalyzer as heretofore described, the process becomes one of fixation of atmospheric nitrogen.

I claim:

1. The process for making sodium cyanid comprising heating activated carbon, sodium carbonate and a catalyzer in an atmosphere of nitrogen at elevated temperatures.

2. The method of manufacturing sodium cyanid comprising heating activated carbon, sodium carbonate and metallic iron in an atmosphere of nitrogen at elevated temperatures.

3. The process for manufacturing cyanids comprising heating activated carbon, a base or base yielding compound and metallic iron in nitrogen at elevated temperatures.

4. The process of making cyanids which comprises heating at temperatures substantially above 800° C. activated carbon, sodium carbonate and metallic iron in an atmosphere of nitrogen.

5. The process of manufacturing cyanids by heating activated carbon with bases or base yielding compounds in an atmosphere of nitrogen.

6. The process of manufacturing cyanids comprising heating activated carbon with a base or base yielding compound and a catalyzer and subjecting them to reaction with nitrogen.

7. A process for the fixation of nitrogen comprising heating nitrogen with activated carbon, a base or base yielding compound and a catalyzer at elevated temperatures.

OSCAR L. BARNEBEY.